United States Patent
Le Quere

(10) Patent No.: US 8,297,658 B2
(45) Date of Patent: Oct. 30, 2012

(54) COUPLING DEVICE FITTED WITH INSTANTANEOUS OR QUASI-INSTANTANEOUS ANCHOR MEANS

(75) Inventor: Philippe Le Quere, Betton (FR)

(73) Assignee: Parker-Hannifin Corporation, Cleveland, OH (US)

( * ) Notice: Subject to any disclaimer, the term of this patent is extended or adjusted under 35 U.S.C. 154(b) by 298 days.

(21) Appl. No.: 12/637,189

(22) Filed: Dec. 14, 2009

(65) Prior Publication Data

US 2010/0148499 A1    Jun. 17, 2010

(30) Foreign Application Priority Data

Dec. 12, 2008    (FR) .................................... 08 06982

(51) Int. Cl.
F16L 37/091 (2006.01)
F16L 37/127 (2006.01)
F16L 37/138 (2006.01)
F16L 37/16 (2006.01)

(52) U.S. Cl. .............. 285/35; 285/34; 285/83; 285/307; 285/308; 285/316

(58) Field of Classification Search .................. 285/308, 285/314–315, 322–324, 361, 395, 396, 107, 285/316, 83, 307, 391, 392, 34, 35
See application file for complete search history.

(56) References Cited

U.S. PATENT DOCUMENTS

| | | | | |
|---|---|---|---|---|
| 2,849,245 | A * | 8/1958 | Baker | 285/123.6 |
| 2,888,278 | A | 5/1959 | Torres et al. | |
| 2,994,381 | A * | 8/1961 | Brown | 166/208 |
| 4,601,492 | A * | 7/1986 | George | 285/3 |
| 5,209,528 | A | 5/1993 | Weh et al. | |
| 5,366,259 | A | 11/1994 | Hohmann et al. | |
| 5,788,443 | A * | 8/1998 | Cabahug | 411/385 |
| 7,344,162 | B2 * | 3/2008 | Van Bilderbeek | 285/95 |
| 7,452,006 | B2 * | 11/2008 | Kohda | 285/316 |
| 7,568,737 | B2 * | 8/2009 | Wells et al. | 285/391 |
| 7,878,551 | B2 * | 2/2011 | McHugh et al. | 285/308 |
| 8,007,009 | B2 * | 8/2011 | Vogel et al. | 285/35 |
| 2003/0155763 | A1 * | 8/2003 | Wolf et al. | 285/39 |
| 2004/0070197 | A1 * | 4/2004 | Densel et al. | 285/39 |

FOREIGN PATENT DOCUMENTS

GB    1104697    2/1968

OTHER PUBLICATIONS

Search Report for corresponding French Application No. 0806982 dated Sep. 1, 2009.

* cited by examiner

*Primary Examiner* — James Hewitt
(74) *Attorney, Agent, or Firm* — Renner, Otto, Boisselle & Sklar LLP

(57) ABSTRACT

A coupling device comprising a tubular body defining a channel and axially subdivided into an anchor section provided on the outside with an anchor member associated with a cover mounted on the body to have both an actuator end for actuating the anchor member and a drive end, and so as to be movable between an inactivation position and an activation position, a resilient return member urging the cover towards the activation position being mounted in a chamber defined by the cover and the body, the cover having a holder device for holding it in the inactivation position, which holder device is arranged to be declutchable when the cover is moved into a declutching position beyond its inactivation position in a direction away from the activation position, and the device including a passage for putting the chamber into communication with the well.

14 Claims, 3 Drawing Sheets

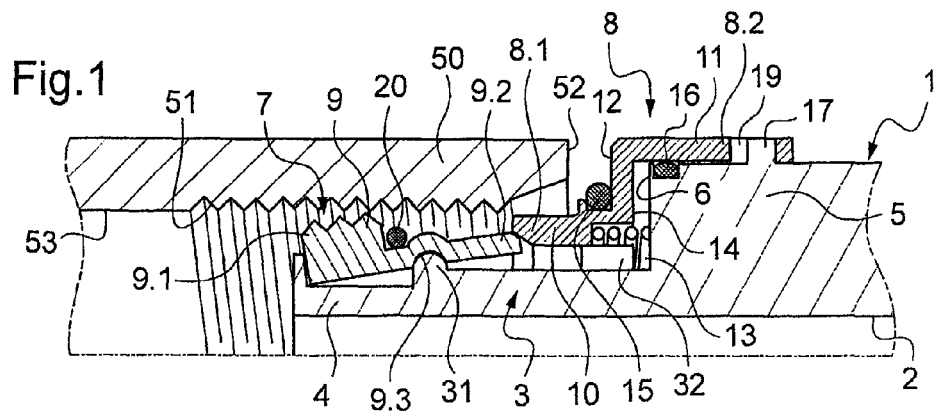
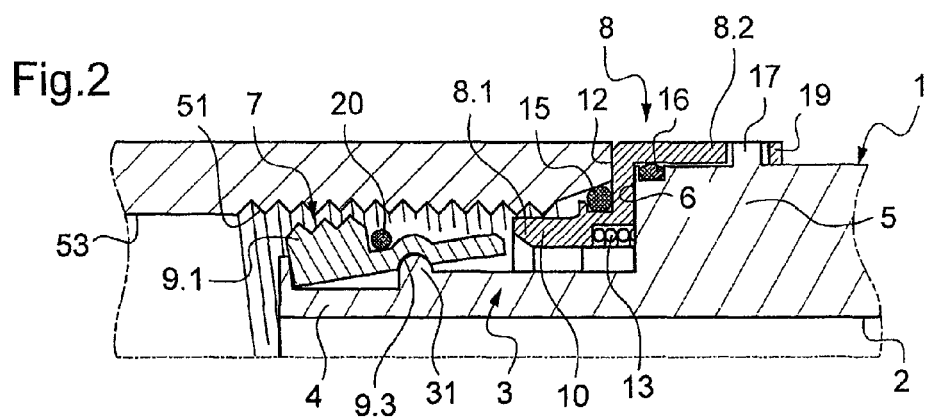
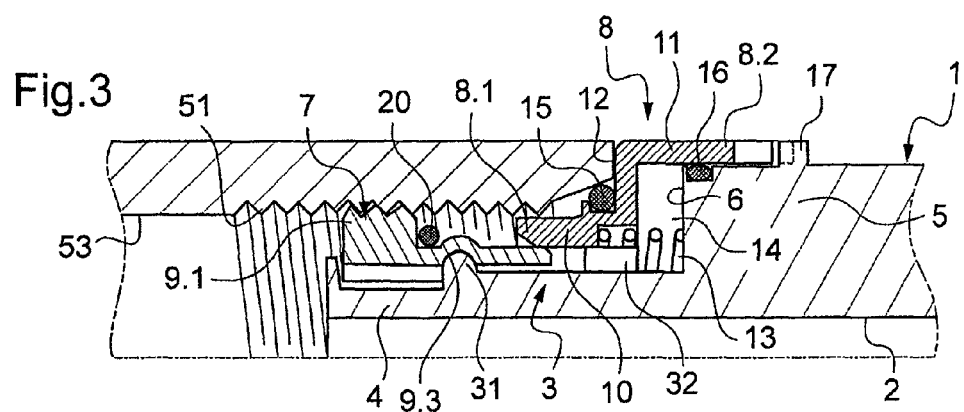
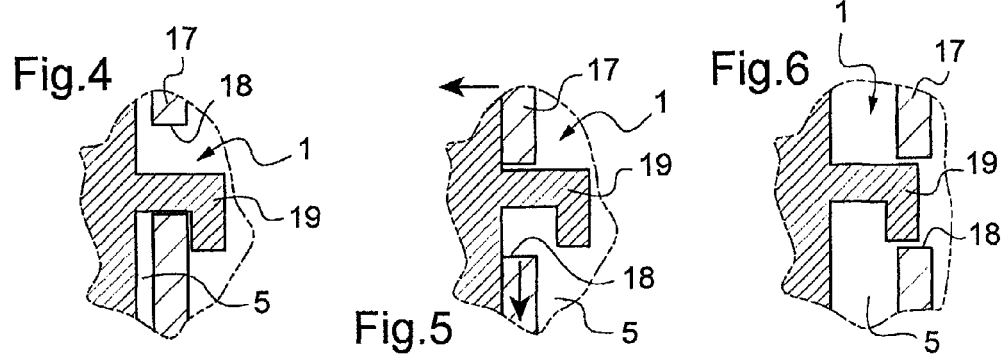

COUPLING DEVICE FITTED WITH INSTANTANEOUS OR QUASI-INSTANTANEOUS ANCHOR MEANS

CROSS-REFERENCE TO RELATED CASES

The present application claims the benefit of the filing date of French Patent Application Serial No. 08 06982, filed Dec. 12, 2008, the disclosure of which is expressly incorporated herein by reference.

BACKGROUND OF THE INVENTION

The present invention relates to a coupling device for coupling a duct end to a fluid-transport circuit element. The device is suitable for use in particular for coupling a pipe to a fluid-emitting or receiving element, such as another pipe, a manifold, an actuator, a tank, a pressure or flow rate sensor, etc.

The coupling device generally comprises a tubular body defining a channel that is axially subdivided into an anchor section for anchoring the body in a well of the circuit element and a connection section for connection to the duct end. The anchor section is provided on the outside with an anchor member that has an anchoring state and a releasing state. The anchor member is associated with a cover mounted on the body so as to have both an actuator end for actuating the anchor element and a drive end, and so as to be movable between an inactivation position towards the drive end and an activation position towards the actuator end. A resilient return member urges the cover towards the activation position and is mounted between the cover and the body. In that type of device, the cover needs to be taken into its inactivation position and held therein in order to enable the anchor section to be inserted into the well. That combination of movements makes using such coupling devices rather impractical.

SUMMARY OF THE INVENTION

The invention provides a coupling device for coupling a duct end to an element of a fluid-transport circuit, the coupling device comprising a tubular body defining a channel that is axially subdivided into an anchor section for anchoring the body to the inside wall of a well of the circuit element, and a connection section for connection to the duct end, the anchor section being provided on the outside with an anchor member that has an anchoring state and a releasing state, that is associated with a cover mounted on the body so as to have both an actuation end for actuating the anchor member and a drive end, and so as to be movable between an inactivation position towards the drive end and an activation position towards the actuator end, a resilient return member for urging the cover into the activation position being mounted in a chamber defined by the cover and the body. The cover includes holder means for holding it in the inactivation position, which holder means are arranged to be declutchable when the cover is moved into a declutching position beyond its inactivation position away from the activation position, and the device includes communication means for putting the chamber into communication with the well, the cover presenting a section that is greater beside the chamber than its section beside the well.

Advantageously, the cover is movable relative to the anchor member.

Thus, since the anchor member is held in the inactivation position, the anchor section may be engaged in the well without any particular manipulation of the cover, until the cover comes into abutment against the circuit element and is pushed back into its declutching position. The pressure in the circuit also tends to force the cover into the activation position and to press the cover against the circuit element so that a sealing element disposed between the circuit element and the cover presents increased effectiveness.

In a first embodiment, the holder means, the cover, and the body are arranged in such a manner that the cover in the declutching position is capable of pivoting so as to leave it free to slide towards the activation position.

Once the operator has engaged the anchor section in the well, it suffices merely to pivot the cover in order to release it for sliding towards the activation position. The cover return spring then pushes the body back until the actuator end of the cover co-operates with the anchor member and moves it into its anchoring state.

Under such circumstances, and preferably, the holder means comprise at least one portion in relief secured to the body and the drive end of the cover comprises a gripper member for gripping the portion in relief when it is in the inactivation position, the cover being capable of being pivoted when it is in the declutching position so as to disengage the portion in relief from the gripper member.

The structure of the first embodiment is thus particularly simple.

In a second embodiment, the holder means, the cover, and the body are arranged in such a manner that moving the cover into its declutching position causes the cover to pivot, thereby leaving it free to slide towards the activation position.

This arrangement provides instant coupling of the anchor section in the well without requiring the cover to be manipulated by the user.

Under such circumstances, and preferably, the holder means comprise at least one stud projecting from the body and slidably received in a groove of the cover that has an axial segment with a first end and a second end for receiving the stud respectively when the cover is in the activation position and when it is in the declutching position, and an inclined segment having a first end connecting with the second end of the axial segment and a second end for receiving the stud when the cover is in the inactivation position, and advantageously, the groove is harpoon-shaped.

This structure is particularly simple and is found to be easy to make.

According to a particular feature of the anchor member, the anchor member comprises a bushing subdivided into rocking sectors each having an anchor end that is movable from a releasing position towards an anchoring position, and a drive portion for co-operating with the actuator end of the cover.

The anchor member then provides reliable anchoring and is more particularly adapted to anchoring in a tapped well when the anchor ends are themselves threaded.

According to two alternative activation techniques:

the drive portion is arranged on the anchor end, the anchor end extending beside the cover and the drive end of the cover being engaged in the bushing beside the anchor ends so as to move them apart from one another when the cover is in the activation position; and the drive portion is arranged on an end remote from the anchor end, said end extending beside the cover and the drive end of the cover being arranged to engage on said remote ends in order to urge them towards one another when the cover is in the activation position.

Advantageously, the sectors are urged elastically towards the releasing position by a return element engaged on the anchor ends, and preferably, the return element is a resilient split ring.

Also advantageously, the communication means comprise at least one opening formed in a front wall of the cover.

BRIEF DESCRIPTION OF THE DRAWINGS

Other characteristics and advantages of the invention appear on reading the following description of particular, non-limiting embodiments of the invention.

Reference is made to the accompanying figures, in which:

FIGS. 1, 2, and 3 are fragmentary half-views in longitudinal section of a coupling device constituting a first embodiment of the invention, shown respectively before, during, and after connection with a circuit element;

FIGS. 4, 5, and 6 are fragmentary plan views of the coupling device, respectively before, during, and after connection to the circuit element;

DETAILED DESCRIPTION

Figure 7:
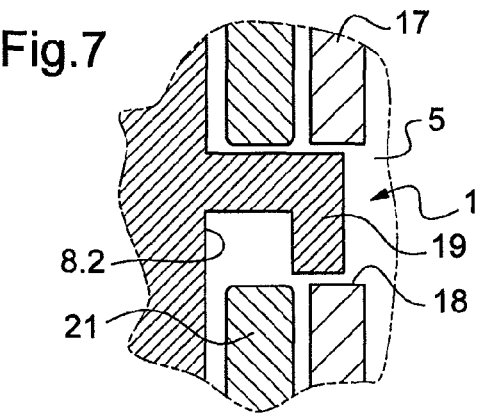
FIG. 7 is a view analogous to FIG. 6 showing a member for blocking the cover in the activation position.
Figure 8:
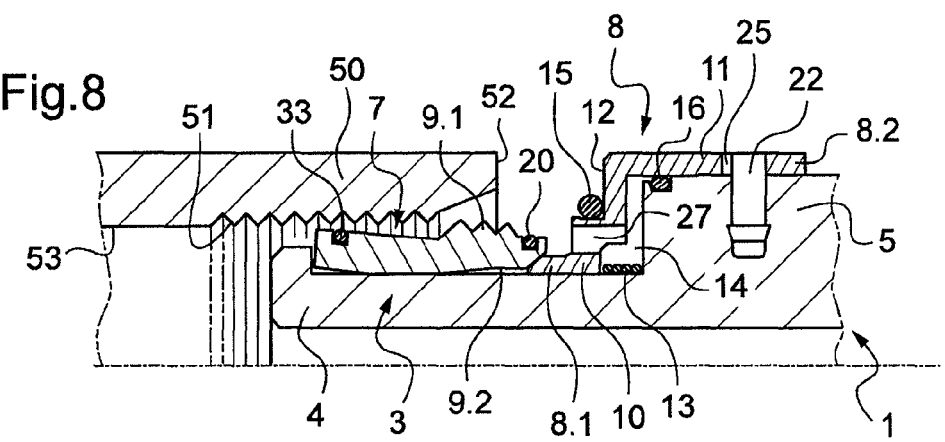
FIGS. 8, 9, and 10 are views analogous to the views of FIGS. 1, 2, and 3 respectively, and showing a coupling device constituting a second embodiment of the invention.
Figure 9:
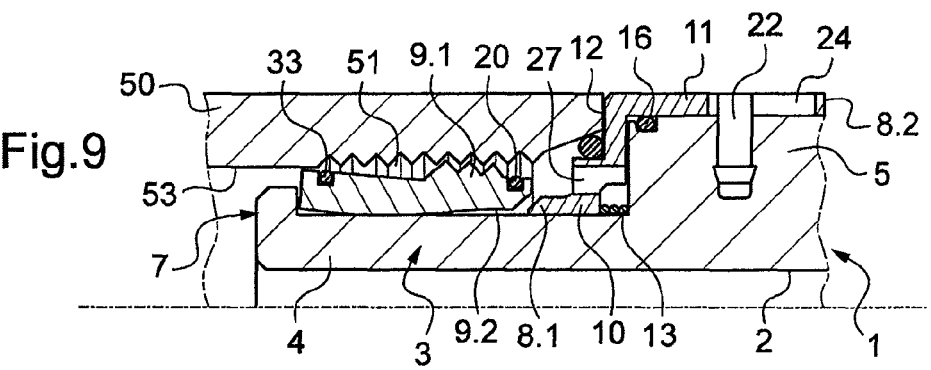

With reference to the figures, the coupling device in accordance with the invention is for coupling a duct end, such as the end of a pipe, to an element of a fluid transport circuit, such as an element for emitting or receiving fluid, and in particular a manifold, an actuator, a flow rate or pressure detector, a tank, etc. The circuit element 50 includes tapped well 51 formed in a surface 52 of the circuit element 50 and extended by a fluid transport duct 53.

The coupling device comprises a body given overall reference 1 that is tubular and that defines a channel 2, which channel is axially subdivided into an anchor section 3 for anchoring the body 1 in the well 51 of the circuit element 50, and a connection section for connection to the duct end.

The connection section is not shown herein since it is already known and comprises for example quick connection means such as an elastically deformable toothed washer for catching the end of the duct, or a radially movable latch for engaging behind a step in the duct end or for releasing it.

The anchor section 3 has an end portion 4 and a link portion 5 for linking to the connection section. The end portion 4 has a diameter smaller than the diameter of the well 51 and it is connected via a shoulder 6 to the link portion 5 that has a diameter greater than the diameter of the well 51. The end portion 4 is provided on the outside with an anchor member given overall reference 7, which anchor member has an active anchoring state and an inactive releasing state and it cooperates with a cover 8 that is slidably mounted on the anchor section 3 to slide between an activation position and an inactivation position for the anchor member 7.

With reference to FIGS. 1 to 7, the anchor member comprises a bushing subdivided into rocking sectors 9 each having an anchor end 9.1 with an outside thread and an actuator portion 9.2 formed at its opposite end. Between the actuator portion 9.2 and the anchor end 9.1 there is provided a transverse groove 9.3 of U-shaped section that is engaged on an annular bead 31 projecting from the end portion 4 to form a hinge allowing the sectors 9 to rock between the anchoring position in which the anchor ends 9.1 define a diameter equal to the nominal diameter of the well 51 and are designed to come into contact with its tapping, and a releasing position in which the anchor ends 9.1 define a diameter that is smaller than the nominal diameter of the well 51 and in which they are designed to be separated from its tapping. The anchor element 7 includes a return element for urging the sectors 9 into the releasing position. The anchor member is a resilient split ring 20 of metal surrounding the sectors 9.

The cover 8 possesses an actuator end 8.1 for actuating the anchor member 7, and a drive end 8.2 for being manipulated by an operator. Beside the actuator end 8.1, the cover 8 has an annular bearing surface 10 mounted to slide on the end portion 4, and an annular bearing surface 11 mounted to slide on the link portion 5 and connected to the bearing surface 10 by a radial wall 12. The bearing surface 10 is fitted in the vicinity of the wall 12 with an O-ring 15 for coming into contact with the entry to the well 51. The link portion 5 is provided with an annular sealing gasket 16 in contact with the bearing surface 11. The cover 8 is thus movable between an inactivation position for inactivating the anchor member 7, which position is towards the drive end 8.2, and an activation position for activating the anchor member 7, which position is towards the actuator end 8.1.

A resilient return member 13 for urging the cover 8 towards the activation position is mounted in a chamber 14 defined by the cover 8 and the body 1. More precisely, the resilient return element 13 is a helical spring extending coaxially about the end portion 4 between the wall 12 and the shoulder 6. The device includes means for putting the chamber 14 into communication with the well 51. These means comprise a plurality of channels 32 formed axially in the bearing surface 10: the bearing surface 10 is fluted. The cover 8 presents a section that is greater beside the chamber 14 than beside the well 51. More precisely, the bearing surface 10 presents an outside diameter (beside the O-ring 15 against the wall 12) that is less than the diameter of the perimeter of the wall 12 inside the chamber 14.

The cover 8 has holder means for holding it in the inactivation position, which means are arranged to be declutchable when the cover 8 is moved into a declutching position beyond the inactivation position away from the activation position.

In the first embodiment, the holder means, the cover 8, and the body 1 are arranged in such a manner that the cover 8 in the declutching position is capable of pivoting so as to leave it free to slide towards the activation position. In this example the holder means comprise at least one portion in relief secured to the body, and the drive end 8.2 of the cover 8 has a gripper member for gripping the portion in relief when the cover 8 is in the inactivation position, it being possible for the cover 8 to be pivoted when it is in the declutching position so as to disengage the portion in relief from the gripper member. The portion in relief is a collar 17 that extends around the link portion 5, the collar 17 being interrupted by an opening 18. The gripper member comprises a hook 19 extending axially from the drive end 8.2.

When the cover 8 is in the inactivation position (FIGS. 1 and 4), the hook 19 extends in the opening 18 and is engaged on one end of the collar 17 at the edge of the opening 18, thereby holding the cover 8 in the inactivation position against the force exerted by the resilient member 13. The sectors 9 are held in the releasing position by the resilient split ring 20.

When the anchor section 3 is inserted in the well 51, the wall 12 comes into abutment against the surface 52, which pushes the cover 8 back towards the declutching position (see FIGS. 2 and 5). The operator can then cause the cover 8 to pivot so as to disengage the hook 19.

On releasing the insertion force, the body 1 moves back under drive from the resilient member 13, which causes the cover 8 to move towards its activation position (FIGS. 3 and 6). In the activation position, the activation end 8.1 overlies the drive portions 9.2 of the sectors 9, moving said portions towards one another and causing the sectors 9 to tilt into their anchoring positions.

It will be understood that the fluid under pressure penetrating into the chamber 14 holds the cover 8 in its activation position and reinforces the sealing produced by the sealing gasket 15.

To prevent accidental movement of the cover 8 towards its inactivation position, it is possible to place a resilient split ring 21 around the link portion 5 between the drive end 8.2 and the collar 17 (see FIG. 7).

Figure 10:
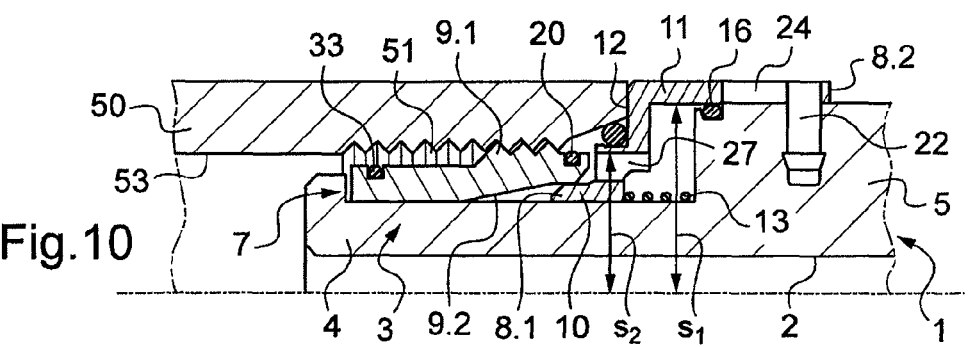

In the second embodiment, shown in FIGS. 8 to 14, the drive portions 9.2 of the sectors 9 are arranged on the anchor ends 9.1 that extend, in this example, beside the cover 8 and the actuation end 8.1 of the cover 8, is arranged to engage under said drive portions so as to move them apart from one another when the cover 8 is in the activation position. The sectors 9 bear against the end portion 4 via curved portions. In FIG. 10, the section of the cover 8 beside the chamber 14 is referenced s1 and the section of the cover 8 beside the well 51 is referenced s2, and in accordance with the invention, the chamber side section s1 of the cover is greater than the well side section s2 of the cover.

A resilient metal ring 33 surrounds the ends of the sectors 9 remote from their anchor ends 9.1 so as to hold them together. The cover 8 includes at least one opening 27 arranged in the front wall of the cover.

Figure 11:
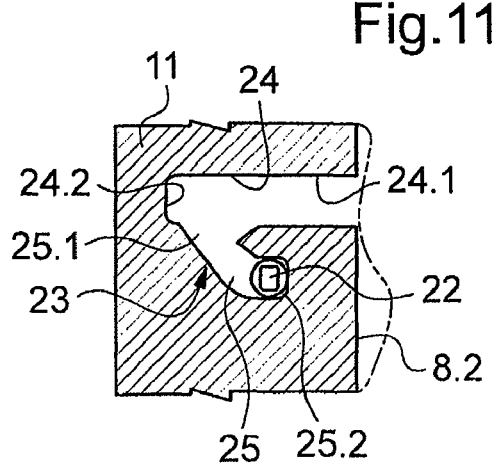
FIGS. 11, 12, and 13 are views analogous to the views of FIGS. 4, 5, and 6 respectively, showing the second embodiment.
Figure 12:
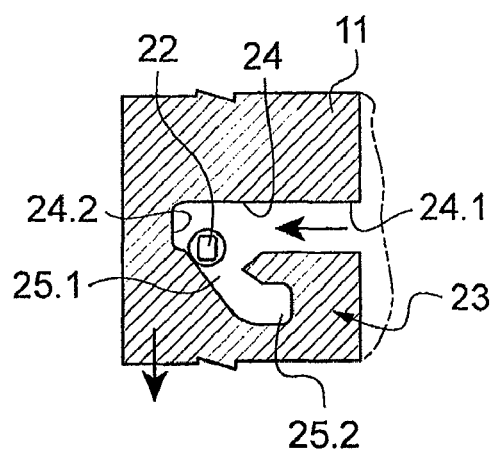
Figure 13:
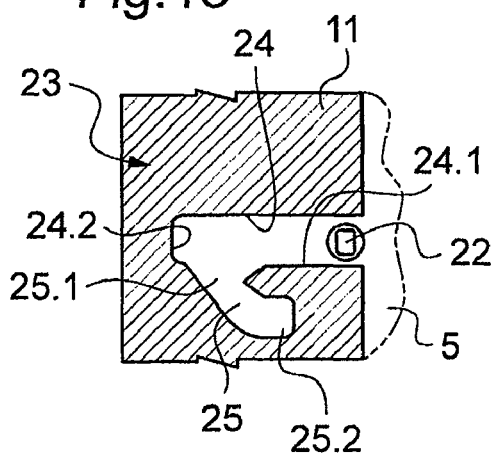
Figure 14:
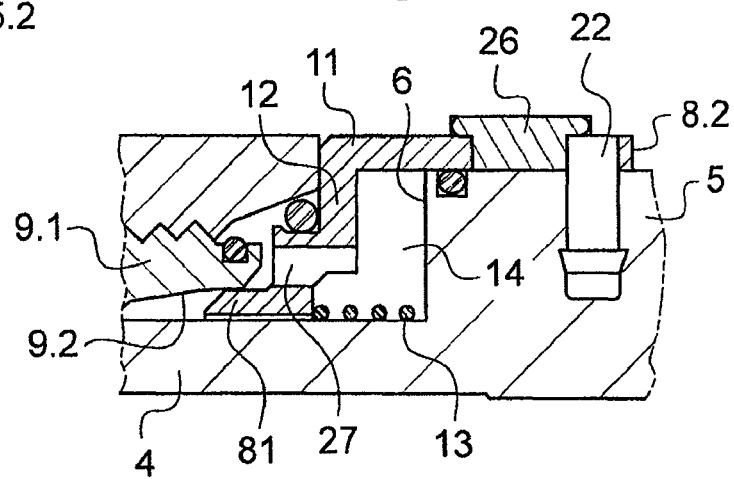
FIG. 14 is a view analogous to FIG. 7 showing a member for blocking the cover in the activation position in the second embodiment.

The holder means for holding the cover 8 in the inactivation position comprise at least one stud 22 projecting from the link portion 5 of the body 1 and slidably received in a groove 23 of the cover 8, which groove is harpoon-shaped, having an axial segment 24 with a first end 24.1 and a second end 24.2 for receiving the stud 22 respectively when the cover is in the activation position (FIG. 13) and when it is in the declutching position (FIG. 12), and a sloping segment 25 having a first end 25.1 connected to the second end 24.2 of the axial segment 24 and a second end 25.2 for receiving the stud 22 when the cover 8 is in the inactivation position (FIG. 11).

The holder means, the cover 8, and the body 1 are thus arranged in such a manner that moving the cover 8 from its inactivation position (FIG. 8) towards its declutching position (FIG. 9) causes the cover 8 to pivot, thereby leaving it free to slide towards the activation position (FIG. 10).

It is possible to place a split ring 26 on the bearing surface 11 of the cover 8, the split ring 26 including an inwardly-projecting tab for entering into the axial segment 24 and preventing the stud 22 from moving towards the second end 24.2.

Naturally, the invention is not limited to the embodiments described but covers any variant coming within the field of the invention as defined by the claims.

In particular, the portion in relief formed on the body may be an annular element, a tab, or a stud.

The invention may be obtained by combining the two embodiments described or by kinematically inverting them.

The metal split rings 33 and 20 may be replaced by resilient rings made of elastomer, such as O-rings.

What is claimed is:

1. A coupling device for coupling a duct end to an element of a fluid-transport circuit, the coupling device comprising:
a tubular body defining a channel, the channel being axially subdivided into an anchor section for anchoring the body to an inside wall of a well of the circuit element and a connection section for connection to the duct end, the anchor section being provided on an outside with an anchor member that has an anchoring state and a releasing state, the anchor member being configured to cooperate with a cover mounted on the body, the cover having an actuation end for actuating the anchor member and a drive end and being movable away from the anchor member to an inactivation position and towards the anchor member to an activation position,
a resilient return member for urging the cover into the activation position being mounted in a chamber defined by the cover and the body,
wherein the cover includes a holder device configured to hold the cover in the inactivation position, which holder device is arranged to be declutchable when the cover is moved into a declutching position beyond its inactivation position away from the activation position, and
wherein the device includes a passage configured to put the chamber into communication with the well, the cover having a cross section beside the chamber that is greater than a cross section beside the well.

2. A device according to claim 1, wherein the holder device, the cover, and the body are arranged in such a manner that the cover in the declutching position is capable of pivoting so as to leave it free to slide towards the activation position.

3. A device according to claim 2, wherein the holder device comprises at least one portion in relief secured to the body and the drive end of the cover comprises a gripper member for gripping the portion in relief when it is in the inactivation position, the cover being capable of being pivoted when it is in the declutching position so as to disengage the portion in relief from the gripper member.

4. A device according to claim 1, wherein the holder device, the cover, and the body are arranged in such a manner that moving the cover into its declutching position causes the cover to pivot, thereby leaving it free to slide towards the activation position.

5. A device according to claim 4, wherein the holder device comprises at least one stud projecting from the body and slidably received in a groove of the cover that has an axial segment with a first end and a second end for receiving the stud respectively when the cover is in the activation position and when it is in the declutching position, and an inclined segment having a first end connecting with the second end of the axial segment and a second end for receiving the stud when the cover is in the inactivation position.

6. A device according to claim 5, wherein the groove is harpoon-shaped.

7. A device according to claim 1, wherein the anchor member comprises a bushing subdivided into rocking sectors each having an anchor end that is movable from a releasing position in the releasing state towards an anchoring position in the anchoring state, and a drive portion for co-operating with the actuation end of the cover.

8. A device according to claim 7, wherein the drive portion is arranged on the anchor end, the anchor end extending beside the cover and the actuation end of the cover being engaged in the bushing beside the anchor ends so as to move them apart from one another when the cover is in the activation position.

9. A device according to claim 7, wherein the drive portion is arranged on an end remote from the anchor end, said end remote from the anchor end extending beside the cover and the actuation end of the cover being arranged to engage on said remote ends in order to urge them towards one another when the cover is in the activation position.

10. A device according to claim 8, wherein the sectors are urged elastically towards the releasing position by a return element engaged on the anchor ends.

11. A device according to claim 10, wherein the return element is a resilient split ring.

12. A device according to claim 1, wherein the passage comprises at least one opening formed in a front wall of the cover.

13. A device according to claim 1, wherein the cover includes a guide annular bearing surface configured to slide on an end portion of the anchor section, the passage comprising at least one channel formed axially in the bearing surface.

14. A device according to claim 13, wherein the bearing surface is fluted.

* * * * *